United States Patent Office 2,810,666
Patented Oct. 22, 1957

2,810,666

DEACTIVATION OF CATALYSTS

Willard S. Gleason, Lewiston, N. Y., assignor to E. I. du Pont de Nemours and Company, Wilmington, Del., a corporation of Delaware No Drawing. Application December 29, 1955, Serial No. 556,052

12 Claims. (Cl. 148—6.14)

This invention relates to the deactivation of catalysts of the foraminous or "Raney" nickel type.

In a series of patents, of which U. S. Patent 1,915,473 may be considered representative, Murray Raney has disclosed catalysts of the foraminous type. These catalysts are formed by sequentially alloying nickel or other hydrogenation catalyst with aluminum and then dissolving away portions of the aluminum as increased activity is desired. The alloys may contain initially between about 5 and 95% by weight of aluminum and a remainder of the hydrogenation catalyst. The dissolution step, generally carried out by means of a sodium hydroxide solution, is frequently repeated several times during the life of the catalyst. Eventually of course a condition is reached when the catalyst cannot be regenerated and must be discarded.

Although the spent material is no longer economically effective as a catalyst, it frequently still possesses some activity. This activity may be so great as to render the material pyrophoric under ambient conditions. The pyrophorism gradually raises the temperature of the catalyst to a point where it incandesces. Since the incandescent material can readily kindle fires, disposal of the spent catalyst becomes a problem.

It will be understood that pyrophorism is not confined to the spent catalyst. Raney nickel may, in fact, be pyrophoric at any time during its life. The catalyst is, however, generally in use or otherwise protected from the atmosphere. Thus pyrophorism does not usually become a problem until the catalyst is discarded.

A broad object of this invention is, consequently, provision of a method for deactivating a Raney foraminous catalyst.

Another object is provision of a method for eliminating pyrophorism in a Raney nickel catalyst.

A further object is provision of a method for treating a spent Raney nickel catalyst so that it can be discarded without danger of pyrophorism.

The above-mentioned and yet further objects are achieved in accordance with this invention by a process in which the foraminous nickel or other Raney catalyst is contacted with an aqueous solution containing the nitrate or the nitrite ion. The sodium compounds are the preferred sources of these ions but other soluble inorganic salts are usable. Particularly valuable are those of potassium, and calcium or other alkali and alkaline earth metals including ammonium. Nitric acid can be employed but does not completely eliminate pyrophorism, possibly because of the hydrogen ion present. Since the nitrate ion is somewhat more effective than the nitrite ion, the former represents the preferred embodiment of the invention.

The most important process variables, in addition to the passivating agent, are the closely interrelated (1) concentration of the agent, (2) time of contact between the catalyst and the solution and (3) the temperature of contact. None of these variables is sharply critical. Pressure is substantially immaterial. Approximately the same conditions are usable with both nitrates and nitrites.

Passivation effects on pyrophoric catalysts can be observed at almost any concentration of sodium nitrate or nitrite. Thus an aqueous solution of 1–10% strength can be employed. Higher concentrations are, of course, effective but unnecessary and hence waste the nitrate. A solution containing between about 3 and 5% by weight is preferred. The passivating effect decreases with decreasing concentration and at a concentration below about 1% becomes undesirably slow.

The concentration of the solution must be adjusted if some compound other than that of sodium is employed. The adjustment is easily carried out following known gravimetric principles, i. e., substituting stoichiometric equivalents. For convenience, the concentration of the ion utilized may be referred to as "an effective passivating amount."

The concentration is not affected by impurities in the solution. These impurities, both inorganic and organic, can themselves be tolerated in about any quantity so long as they do not interfere with the passivating action or react with the selected agent or alloy.

The time of contact between the catalyst and the aqueous solution may be varied between about 10 minutes and an hour or even longer. About 30 minutes is effective with a solution containing 3–5% of sodium nitrate.

Any convenient temperature may be employed between about 0° C. and 50° C. Still higher temperatures are usable but unnecessary. Ambient or room temperature is quite satisfactory and, since it is also convenient, is preferred.

A preferred embodiment of the invention, embracing the preferred conditions set forth above, is easily seen. In this embodiment, the pyrophoric nickel catalyst it is desired to passify is contacted for about 30 minutes at ambient temperature with an aqueous solution containing about 3–5% by weight of sodium nitrate. The catalyst is withdrawn from the solution after this treatment in a state of complete deactivation and remains inactive when dried. In this preferred embodiment nitrite may be substituted for nitrate with only slightly impaired results.

The discussion above is limited primarily to Raney nickel catalysts. Other pyrophoric foraminous catalysts may, however, be treated as described. Raney cobalt, in particular, is subject to such deactivation.

Those skilled in the art will understand that the deactivation treatment is not limited to spent catalysts. It may, in fact, be applied to the catalyst at any time during its life to eliminate pyrophorism. Even a freshly activated catalyst can be treated with the deactivating solution and rendered much safer for shipping or storage. Reactivation of such a passivated catalyst can proceed in the normal manner, i. e. by treatment with a caustic solution, so long the catalyst was not completely spent before the deactivation took place.

The explanation of the passivating action of the nitrate or nitrite ion on the Raney catalysts is not precisely known. It may be due to the formation of an oxide film over the catalystic surface. Other oxidizing agents, as for example hypochlorites, do not however behave in the same manner. Hydrogen peroxide shows some passivating action but not complete elimination of pyrophorism. Sodium chloride, calcium chloride and ammonium chloride give no passivation. The effect of the ion, whatever its origin, is thus quite specific.

There follow some examples which illustrate details of the invention. In these examples all percentages are by weight.

*Example 1* a. A freshly prepared nickel-aluminum alloy containing 40% of nickel was exposed to the air under ambient conditions. The alloy "sparked" vigorously on exposure to air and its temperature rose until it glowed. Paper or other combustible materials contacted with the incandescent catalyst were readily ignited.

b. A comminuted sample of the alloy of (a) was submerged in a 5% solution of sodium nitrate for 30 minutes. When removed from the solution and dried, the sample was completely free from pyrophorism.

Part of the nitrate-passivated material, wet with water, was completely dehydrated with alcohol to test the presence of pyrophorism. The catalyst was completely inactive to air when absolutely dry.

A repetition of this experiment with nitric acid resulted in substantially complete passivation of the alloy.

c. The experiment of (b) was repeated with several other compounds including sodium and potassium nitrites, sodium and calcium chlorides, sodium hypochlorite, ammonium chloride, hydrogen pexoxide, and trichlorethylene. The nitrites gave almost as good results as the nitrates. Some, but not complete, passivation was obtained with hydrogen peroxide and trichlorethylene. No appreciable passivation was obtained with the other compounds.

*Example 2*

A series of spent Raney nickel catalysts was treated for 30 minutes at ambient temperature in an aqueous solution containing 3–5% of sodium nitrate. These samples, which had originally exhibited pyrophorism, were completely inactive when withdrawn from the nitrate solution and dried.

The spent catalysts had been utilized in a continuous hydrogenation process and had been reactivated several times (usually about three) by treatment with sodium hydroxide solution during the course of their active life. While the catalysts are referred to as "spent," they still contained both aluminum and nickel.

Having described my invention,

I claim:

1. The process of eliminating the pyrophorism of a foraminous catalyst selected from the group consisting of nickel-aluminum and cobalt-aluminum alloys which comprises contacting the alloy with an aqueous solution containing an effective passivating amount of an ion of the group consisting of the nitrate and nitrite ions.

2. The process of eliminating the pyrophorism of a foraminous nickel-aluminum alloy catalyst which comprises contacting the same with an aqueous solution containing an effective passivating amount of sodium nitrate.

3. The process of claim 2 in which the concentration of sodium nitrate in the aqueous solution is about 1–10% by weight.

4. The process of claim 3 in which the concentration of sodium nitrate in the aqueous solution is about 3–5% by weight.

5. The process of claim 3 in which the temperature of contact is 0°–50° C.

6. The process of claim 5 in which the temperature of contact is ambient.

7. The process of claim 3 in which the time of contact is about 10–60 minutes.

8. The process of claim 7 in which the time of contact is about 30 minutes.

9. The process of eliminating the pyrophorism of a foraminous nickel-aluminum alloy catalyst which comprises contacting the same at ambient temperature for about 30 minutes with an aqueous solution containing about 3–5% by weight of sodium nitrate.

10. The process of eliminating the pyrophorism of a foraminous nickel-aluminum alloy catalyst which comprises contacting the same with an aqueous solution containing an effective passivating amount of sodium nitrite.

11. The process of claim 10 in which the concentration of sodium nitrite in the aqueous solution is about 1–10% by weight.

12. The process of eliminating the pyrophorism of a foraminous nickel-aluminum alloy catalyst which comprises contacting the same at ambient temperature for about 30 minutes with an aqueous solution containing about 3–5% by weight of sodium nitrite.

References Cited in the file of this patent

UNITED STATES PATENTS

| 1,915,473 | Raney | June 27, 1933 |
| 2,461,396 | Raney | Feb. 8, 1949 |

OTHER REFERENCES

Mellor: "Comprehensive Treatise on Inorganic and Theoretical Chemistry," 1936, vol. 15, pp. 92–93, vol. 5 (1936) p. 194 Longmans, Green and Co., New York.